United States Patent [19]

Duncan et al.

[11] 4,231,540
[45] Nov. 4, 1980

[54] MIRROR CONNECTOR

[76] Inventors: Rodney A. Duncan, 1521 Pound Dr., Flint, Mich. 48504; Wendel W. Hall, 351 Beach, Mt. Morris, Mich. 48458

[21] Appl. No.: 969,422

[22] Filed: Dec. 14, 1978

[51] Int. Cl.² .............................................. A47G 1/24
[52] U.S. Cl. .................................... 248/487; 248/558
[58] Field of Search .................. 248/207, 475 R, 479, 248/480, 484, 485, 558

[56] References Cited

U.S. PATENT DOCUMENTS

| | | | |
|---|---|---|---|
| 2,220,468 | 11/1940 | Vasseur | 248/479 |
| 2,552,074 | 5/1951 | Thompson | 248/479 X |
| 2,775,919 | 1/1957 | Fischer | 248/479 |
| 3,166,283 | 1/1965 | Farnsworth | 248/479 X |
| 3,488,026 | 1/1970 | Wallace et al. | 248/480 |
| 3,667,718 | 6/1972 | Goslin et al. | 248/487 |
| 4,011,769 | 3/1977 | Davis | 248/479 X |
| 4,031,771 | 6/1977 | Daley et al. | 248/479 X |

FOREIGN PATENT DOCUMENTS 2403570 8/1974 Fed. Rep. of Germany ........... 248/480
1024701 4/1966 United Kingdom ..................... 248/479

Primary Examiner—James C. Mitchell
Attorney, Agent, or Firm—Gifford, VanOphem, Sheridan & Sprinkle

[57] ABSTRACT

A mirror connector is provided which enables a rectangular rear view mirror of the type customarily used on pick-up trucks and the like to be realigned from its normally vertically aligned longitudinal axis position to a horizontally aligned longitudinal axis mounting. The connector can be used with the original frame to which the mirror was originally mounted. Such a realignment permits the driver of the vehicle a wider view of the area behind the vehicle such that more lanes of roadway are visible than in the original mounting position of the mirror.

4 Claims, 3 Drawing Figures

U.S. Patent  Nov. 4, 1980  4,231,540
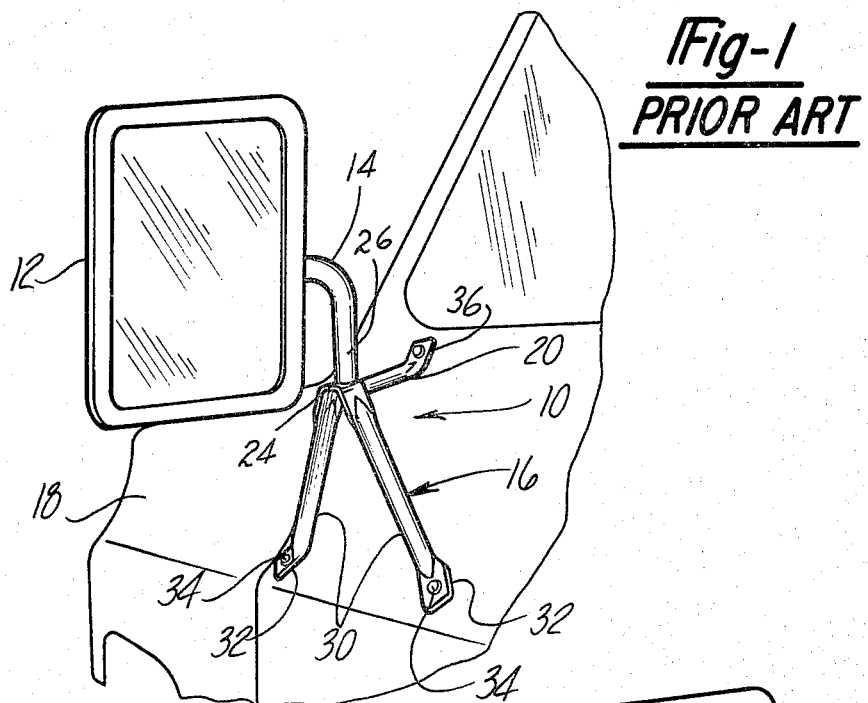
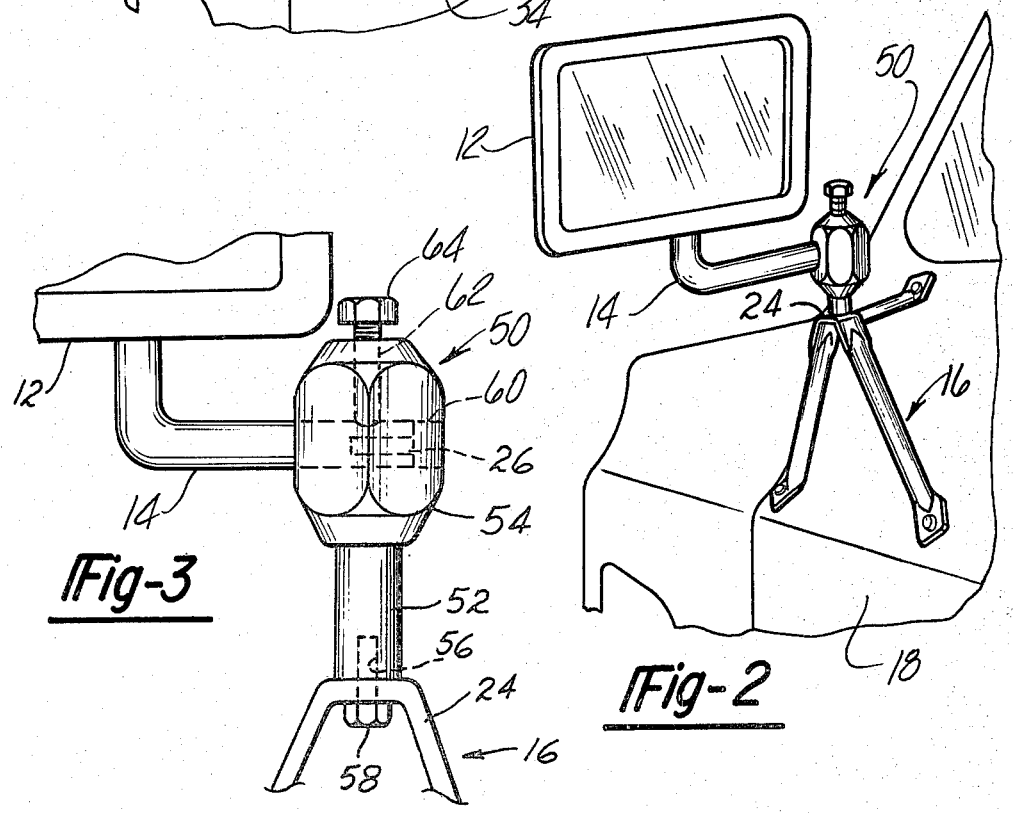

MIRROR CONNECTOR

BACKGROUND OF THE INVENTION

I. Field of the Invention

The invention relates generally to rear view mirror connectors and more specifically, to such a connector which realigns the longitudinal axis of a rectangular mirror.

II. Description of the Prior Art

Previously-known rear view mirror mountings have generally provided for the attachment of a rectangular mirror to the side of a vehicle so that the area behind the vehicle is visible to the driver from the driver's seat without requiring the driver to turn completely around so that the area can be perceived directly. Oftentimes these side mounted mirrors are extended outwardly from the body of the vehicle so that the driver is still able to see the area behind him clearly in the mirror even though a wide load may be secured to the rear of the vehicle. Moreover, since roads are often constructed with many lanes, it would be advantageous to provide a wider view of the area behind the vehicle so that several lanes can be viewed at a glance.

In order to provide a wider view, some previously-known mounting frames are constructed to support a horizontally-aligned rectangular mirror. However, many previously-known mirror mountings which are supplied as standard equipment on motor vehicles have provided only a vertical alignment of a rectangular mirror since the cabs of such vehicles were often very high and such alignment of the mirror was visually pleasing as well as offering the driver a complete view of the side of the vehicle top to bottom. Since, however, it is usually more advantageous to have a wider view than a higher view, especially since all traffic is traveling at the same level, it was necessary to replace the entire mirror mounting frame with a new frame constructed to support a horizontally aligned rectangular mirror in order to obtain a wider view. However, such replacement is not only costly but is wasteful since it leaves the vehicle owner with a mirror mounting frame not likely to be used again. Thus, rather than buying a new mirror mounting kit, it would be advantageous to provide an adapter which would realign the mirror from a vertical to a horizontal alignment within the mounting frame originally mounted on the vehicle in order to increase the width of the view of the area behind the vehicle.

SUMMARY OF THE INVENTION

The present invention provides the above-mentioned advantages by providing a mirror connector having an elongated body which is secured in a vertical position at its lower end to a flange of the mounting frame to which the support stem of the rectangular mirror was originally secured. The body is provided with a transverse bore therethrough adapted to receive a shank of the support stem of the rectangular mirror. Selectively adjustable locking means are provided in the body of the connector so that the mirror can be selectively positioned and then locked into place. Thus, the entire mirror mounting system originally purchased need not be discarded. The addition of this single connector permits realignment of the rearview mirror such that a wider view of the area behind the vehicle is visible to the driver from the driver's seat without requiring replacement of the originally purchased mirror mounting structure. The invention thus provides an economical and simple means for readjusting the alignment of a conventionally-mounted rectangular mirror from its originally vertically-aligned longitudinal axis position to a horizontally-aligned position.

BRIEF DESCRIPTION OF THE DRAWINGS

The invention will be more clearly understood by reference to the following detailed description and accompanying drawings wherein like reference characters refer to like parts throughout the several views and wherein:

FIG. 1 is a perspective view of the prior art rear view mirror mounting assembly;

FIG. 2 is a perspective view of the rear view mirror mounting assembly shown in FIG. 1 but having the connector of the present invention secured thereto; and FIG. 3 is a fragmentary rear plan view of the mounting assembly incorporating the connector of the present invention.

DETAILED DESCRIPTION OF THE PRESENT INVENTION

Referring now to FIG. 1 a previously-known rear view mirror mounting assembly 10 is thereshown comprising a mirror 12 having one end of a support rod 14 secured thereto. A mounting bracket 16 is secured to the other end of the support rod 14 and is adapted to be secured to the vehicle body 18. A lateral support member 20 further secures the bracket 16 to the body 18.

The mirror 12 is rectangular in shape and is mounted to the body 18 so that its longitudinal axis is substantially vertically aligned. Such alignment is provided by the support rod 14 having a 90° bend intermediate its ends. One end of the support rod 14 is secured to the back of the mirror 12 so that one straight portion intermediate that end and the bend extends outwardly from one longitudinal side of the rectangular mirror 12. The other end of the rod 14 is adapted to flatly abut against a flat substantially horizontal surface 24 of the bracket 16 and is provided with an axial threaded bore 26. A bolt having an enlarged heat portion can be inserted through a hole in the flat portion 24 of the bracket 16 and threadably engaged into the bore 26 so that the rod 14 is securely fastened to the bracket 16.

The bracket 16 comprises a substantially flat portion 24, a pair of legs 30 extending downwardly from the flat portion 24, and a mounting foot 32 secured at the bottom of each leg 30. Each mounting foot 32 abuts against the body 18 of the motor vehicle and is secured thereto by appropriate means such as the bolts 34. A lateral support member 20 is secured to the bracket 16 near its substantially flat portion 24 and is provided with a foot 36 substantially the same as the foot 32. The lateral support member 20 supports the top of the bracket 16 a slight distance away from the narrowed upper portion of the body 18 so that the flat portion 24 remains substantially horizontal.

When the mirror is mounted as shown in FIG. 1, the driver of the vehicle is provided with a tall but narrow field of vision to the rear of the vehicle. Although the connection means between the mirror 12 and the one end of the support rod 14 is selectively adjustable to permit small variations in the viewing angle provided by the mirror 12, i.e., so that it can be adjusted to align the field of vision in conjunction with the seating position of the vehicle operator, such adjustment is strictly limited and does not permit the mirror to be realigned so that its longitudinal axis is substantially horizontal, thereby widening the field of vision provided by the rear view mirror 12. Thus, though the operator may be able to see for a long distance to the rear of the vehicle, the width of the view is substantially narrow and may cover only the lane adjacent to the lane in which the vehicle is traveling. Moreover, if a wide load is carried in the rear of the vehicle the width of the field of vision is further narrowed. Nevertheless, this mirror mounting assembly is provided as original equipment on a large number of mass produced vehicles, particularly pick-up trucks.

Referring now to FIG. 2 the mirror connector 50 of the present invention is thereshown connected to the standard equipment assembly illustrated in FIG. 1. As can be seen the adapter 50 permits the mirror 12 to provide a wider field of vision by securing it to the vehicle so that its longitudinal axis is aligned substantially horizontally.

As best shown in FIG. 3, the connector 50 comprises an elongated stem portion 52 and an enlarged housing portion 54 secured to one end of the stem portion 52. The free end of the stem portion 52 is provided with a threaded axial bore 56 adapted to receive a bolt 58 therein. Preferably, the bore 56 is substantially the same size as the bore 26 in the support rod 14. Thus, the connector 50 can be secured to the flat portion 24 of the bracket 16 in the same manner that the rod 14 was originally connected to the bracket 16.

The enlarged housing portion 54 is provided with a radial throughbore 60 substantially the same size as the diameter of the support rod 14. A threaded axial bore 62 extends from the free end of the housing 54 to the radial bore 60. A bolt 64 having a threaded stem which is substantially the same length as the bore 62 is threadably engaged in the bore 62. After the stem 14 has been disconnected from the bracket 16 and the stem portion 52 has been secured to the bracket 16, the support rod 14 is slidably inserted into the radial bore 60 and the bolt 64 is tightened to engage the rod 14 to thereby lockingly secure it in place. Thus, the mirror is secured to the vehicle so that its longitudinal axis is substantially horizontally aligned.

Preferably, the periphery of the housing 54 comprises six equally spaced sides and the bore 60 is disposed through a diametrically opposed pair of sides. Such a hex head configuration permits the housing 54 to be easily engaged by a socket wrench or the like and rotated so that the angle at which the stem 14 extends outwardly from the truck body can be easily adjusted.

Thus, it can be seen that the connector of the present invention permits the standard rectangular mirror supplied as original equipment on motor vehicles, such as pick-up trucks, to be realigned so as to provide a wider field of vision to the rear of the vehicle. In addition, the center of the mirror 12 is spaced apart from the body 18 of the vehicle a greater distance than the original mounting assembly allows, and thereby decreases or eliminates the obstruction to the field of vision caused by an overhanging or extrawide load in the rear of the vehicle.

Generally, a mounting assembly 10 is provided on the left-hand side of the vehicle and a mirror image of the mounting assembly 10 is secured to the right side of the vehicle body 18. When it is desired to horizontally align the mirrors 12, and the connectors 50 have been secured to the brackets 16, the mirror originally mounted on the left-hand side will then be inserted into the connector mounted on the right side of the vehicle and the mirror originally mounted on the right side of the vehicle will be secured to the connector secured to the bracket on the left-hand side of the vehicle. Thus, the original equipment rear view mirrors need not be replaced by new wider mirrors in order to increase the width of the field of vision to the rear of the vehicle.

Having thus described my invention, many modifications thereto will become apparent to those skilled in the art to which it pertains without departing from the scope and spirit of the invention as defined in the appended claims.

What is claimed is:

1. A mirror connector for a rectangular rear view mirror having a substantially L-shaped support stem which is normally secured through an aperture in a horizontal flange of a support frame, said connector comprising:
    an elongated stem having an axial bore at its lower end adapted to threadably receive a bolt therein, and
    a head portion secured to the upper end of said stem, and including a transverse throughbore adapted to slidably receive a shank of the L-shaped support stem, said head portion further including an axial throughbore extending from said transverse throughbore to the top of said head portion adapted to threadably receive a bolt therein to secure said shank within said transverse throughbore.

2. A mirror connector for securing a rectangular mirror to a support frame mounted on a vehicle body, said support frame having a flange with an aperture therethrough, said connector comprising,
    an elongated body having a transverse throughbore adapted to receive a shank of a mirror support stem,
    means for securing said body at its lower end to a support frame, and
    means for securing said shank within said throughbore, wherein said body securing means comprises a lower body portion having a threaded axial bore therein, said bore being registrable with said aperture, and a bolt recieved through said aperture and threadably engageable within said axial bore.

3. The invention as defined in claim 2 wherein said shank securing means comprises an upper body portion having an axial bore therein intermediate said transverse bore and the top of said body, and being threaded therein so that a bolt threadably engaged therein is urged against the shank inserted in said transverse bore and thus, locks the shank therein.

4. A mirror conversion connector for use with a vehicle having two vertically mounted rectangular mirrors, each having an L-shaped support stem which is normally secured through an aperture in a horizontal flange of each of two support frames on each side of the vehicle such that the mirrors extend on opposite sides of the vehicle, said connector comprising:
    an elongated stem having an axial bore at its lower end, said bore being registrable with an aperture of a support frame and adapted to threadably receive a bolt therein so as to secure said stem to said support frame; and
    a head portion secured to the upper end of said stem and including a transverse throughbore adapted to slidably receive the shank of the L-shaped support stem of the mirror which is normally secured through the aperture in the horizontal flange of the opposite support frame, said head portion further having an axial throughbore extending from said transverse throughbore to the top of said head portion adapted to threadably receive a bolt therein to secure the shank of the L-shaped support stem of the mirror which is normally secured through the aperture in the horizontal flange of the opposite support frame, thereby converting the mirror from said opposite support frame to a horizontally mounted position.

* * * * *